Jan. 19, 1926.  1,570,556
V. DI TOMMASO
SAFETY APPLIANCE FOR RAILWAY HAND CARS
Filed April 2, 1924
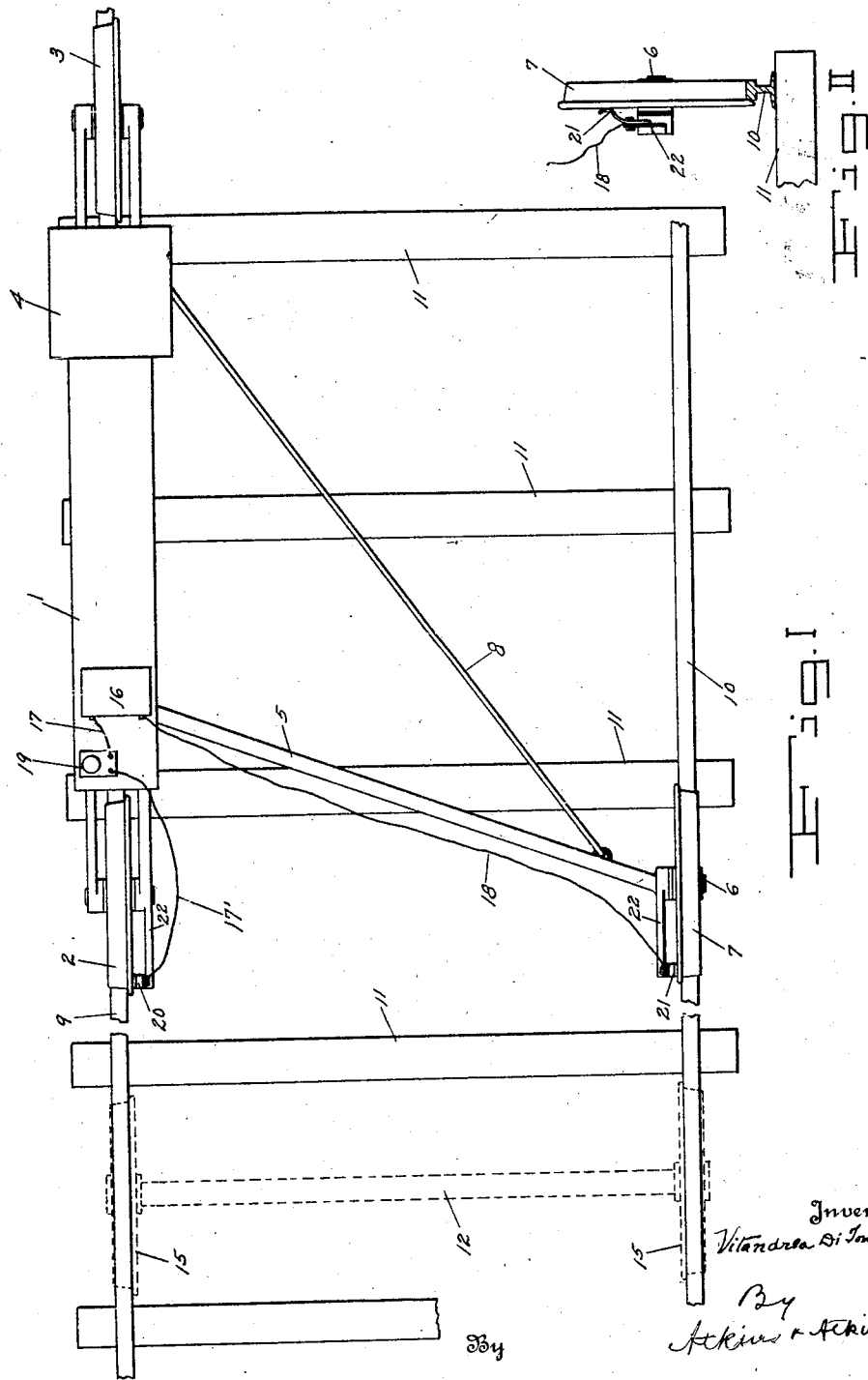

Patented Jan. 19, 1926.

1,570,556

UNITED STATES PATENT OFFICE.

VITANDREA DI TOMMASO, OF MOODY, OREGON.

SAFETY APPLIANCE FOR RAILWAY HAND CARS.

Application filed April 2, 1924. Serial No. 703,701.

*To all whom it may concern:*

Be it known that I, VITANDREA DI TOMMASO, a citizen of the United States of America, and resident of Moody, in the county of Sherman, in the State of Oregon, have invented a certain new and useful Safety Appliance for Railway Hand Cars, of which the following is a specification, reference being had to the accompanying drawing.

My invention relates to means for protecting a car of the handcar type, whether operated by hand or power, against the accident of being run down by a train or engine travelling at the same time upon the track upon which the handcar is travelling.

A handcar comprises usually three wheels two of which travel upon the opposite rails of a railroad track, said two wheels being effectively insulated from each other against conduction of electricity.

My invention consists in a local source of electricity, for example a battery, carried upon a handcar as above described, and in operative electrical communication with the aforesaid two wheels of the car through a suitable signal apparatus, for example an electric bell. The battery makes communication with the track rails along which, respectively, the electric energy generated by the battery, for instance, reaches out through the rails to a distance determined by the power of the battery, but does not make circuit. Whenever circuit is completed by joining the rails together through a conductor such, for example, as the wheels and axle of another car, the result will be to actuate the signal or bell and give the car operator warning of the approach of danger, within time to remove his car from the track in the usual way.

The distance of track length within which circuit may be completed in the manner described in the last sentence, depends upon the power of the battery or other source of electricity, and may be predetermined accordingly.

What constitutes my invention will be hereinafter specified in detail and succintly set forth in the appended claims.

In the accompanying drawing in which I illustrate my invention in simple and therefore preferred form of embodiment, Figure I is a top plan view of two sections of an ordinary railroad track, showing on one section a similar view of a conventional handcar equipped with my invention, and showing on the other section in dotted lines the axle and wheels of car which constitute a cross conductor between the track rails.

Figure II is an elevation of a car wheel looking towards its tread shown in Figure I detached, and showing a brush contact thereon for making electrical connection therewith.

Referring to the numerals on the drawing, 1 indicates a car frame which is carried upon two ordinary car wheels 2 and 3. The frame is usually made of wood which is electrically non-conductive, and is provided with ordinary means for driving it, such for example as a motor concealed within a cover case 4.

Upon one side the frame 1 carries an arm 5 which is usually made of wood, and which carries upon its free end an axle 6 upon which rotates a car wheel 7 of the usual kind.

The arm 5 may be hinged or fixed to the frame 1 as preferred, and is usually braced to the frame as by a brace rod 8.

The car above described is designed and adapted to travel upon an ordinary railroad track composed of rails 9 and 10 whose sections are united end to end so as to form, in effect, two continuous metallic conductors, that are mounted upon non-conductive wooden crossties 11, as usual.

Upon the rails 9 and 10, I indicate in dotted lines a metallic car axle 12 of the ordinary type having fixed to its opposite ends, respectively, car wheels 15, the said wheels and axle being usually made in one integral structure.

The foregoing description is intended to specify any ordinary hand car, the track on which it travels, and the cross conductor represented by the wheels and axle of any ordinary railroad locomotive or car of a train.

The essential elements of my invention are a source of electrical energy, for example a battery 16, electric wires 17, 17', and 18, leading therefrom to the wheels 2 and 7, respectively. One of said wires is broken into two parts 17 and 17' as indicated so as to include in circuit an electric bell 19 or other visible or audible electric signal mechanism.

The wires 17' and 18 are adapted by any suitable means to make contact with the wheels 2 and 7, respectively. In order to insure contact under conditions of car service, I prefer to provide each of said wires with suitable brush-contact terminals 20 and 21 such as are adapted to make brushing contact each with its respective wheel. The terminals are shown for example as carried each on a suitable bracket support 22 mounted on the axle of the wheel with which it makes contact. It will, of course, be understood that the mechanism of my apparatus, particularly the wires thereof, are in practice mounted upon the car in such manner as to the least obtrusive and best protected against accidental dislocation.

The operation of my invention may be briefly described as follows. Let the handcar equipped with my device be assumed to be travelling upon the rails 9 and 10, and that a car comprising a cross-conductor consisting of an axle 12 and wheels 15, for example, approaching it from either direction, come within the reach of the power of the battery 16. Immediately thereupon circuit from the battery will close through the cross-conductor and through the bell 19, for example, causing it to give signal.

Thereupon the operator or occupant of the handcar is notified to remove it from the track out of danger of collision with the car whose approach menaces its safety.

What I claim is:

1. A safety appliance for hand cars comprising the combination with a hand car having upon one side a pair of wheels in tandem relation and on its opposite side a single wheel parallel with and insulated from one of the first mentioned wheels, of an electrically operative signal mechanism, a normally broken electric circuit adapted to be closed through the medium of means external of said hand car for operating the signal mechanism, a source of electric energy on the car, and brush contact terminals engaging a pair of the car wheels for completing the electric circuit and actuating the signal.

2. A safety appliance for hand cars comprising the combination of a hand car consisting of a frame for supporting a pair of wheels in tandem relation, an arm of nonconducting material attached to the frame adjacent one of its ends, the free end of said arm supporting an axle and a wheel arranged in parallel relation with one of the first mentioned wheels, a brace rod between said frame and said arm, an electrically operable signal mechanism, a normally broken electric circuit for operating the signal mechanism whenever the circuit is completed, a source of electrical energy on the car frame, a bracket support carried by the axle of each of the parallel wheels, and a brush contact member carried by each of said brackets in engagement with its respective wheel for making electric connection between said broken circuit and said wheels whereby upon the approach of another vehicle in the track, the signal mechanism will be actuated.

In testimony whereof I have hereunto set my hand.

VITANDREA DI TOMMASO.